J. E. EMLEY.
MECHANICAL MOVEMENT.
APPLICATION FILED FEB. 5, 1916.

1,213,850.

Patented Jan. 30, 1917.
2 SHEETS—SHEET 1.

Witnesses

J. E. Emley, Inventor by C. A. Snow & Co., Attorneys

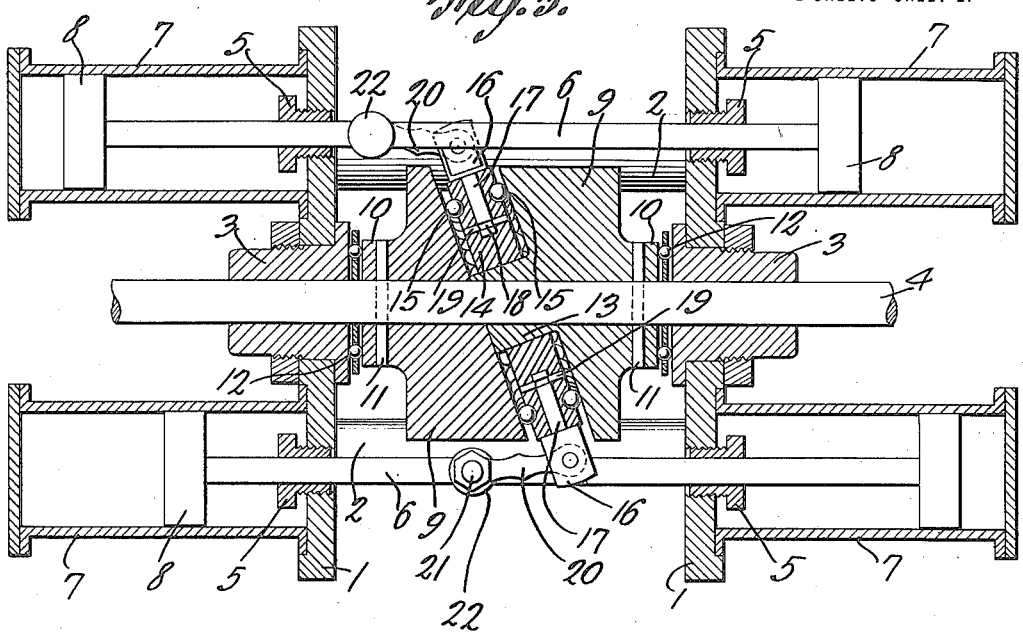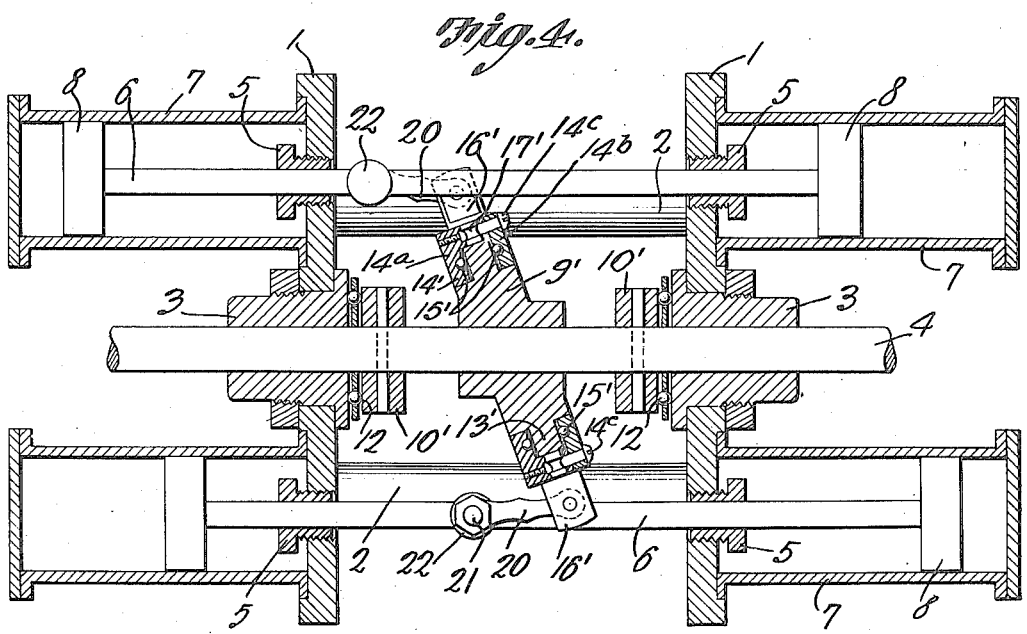

UNITED STATES PATENT OFFICE.

JAMES EDWARD EMLEY, OF MIDDLEPORT, OHIO.

MECHANICAL MOVEMENT.

1,213,850. Specification of Letters Patent. Patented Jan. 30, 1917.

Application filed February 5, 1916. Serial No. 76,420.

*To all whom it may concern:*

Be it known that I, JAMES E. EMLEY, a citizen of the United States, residing at Middleport, in the county of Meigs and State of Ohio, have invented a new and useful Mechanical Movement, of which the following is a specification.

The present invention appertains to mechanical movements, and aims to provide a novel and improved mechanical movement for transmitting motion from a reciprocatory member or members to a rotary shaft or driven element, the device being adapted especially for use in engines, although it can be used for divers purposes.

It is the object of the invention to provide novel means for connecting the piston rod or rods of an engine with the shaft, without using a crank motion, and whereby the reciprocation of the rods will rotate the shaft.

It is also within the scope of the invention to provide a mechanical movement of the nature indicated, which is comparatively simple, compact and inexpensive in construction which operates smoothly and noiselessly, and which serve its office in a thoroughly practical, reliable and efficacious manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1:
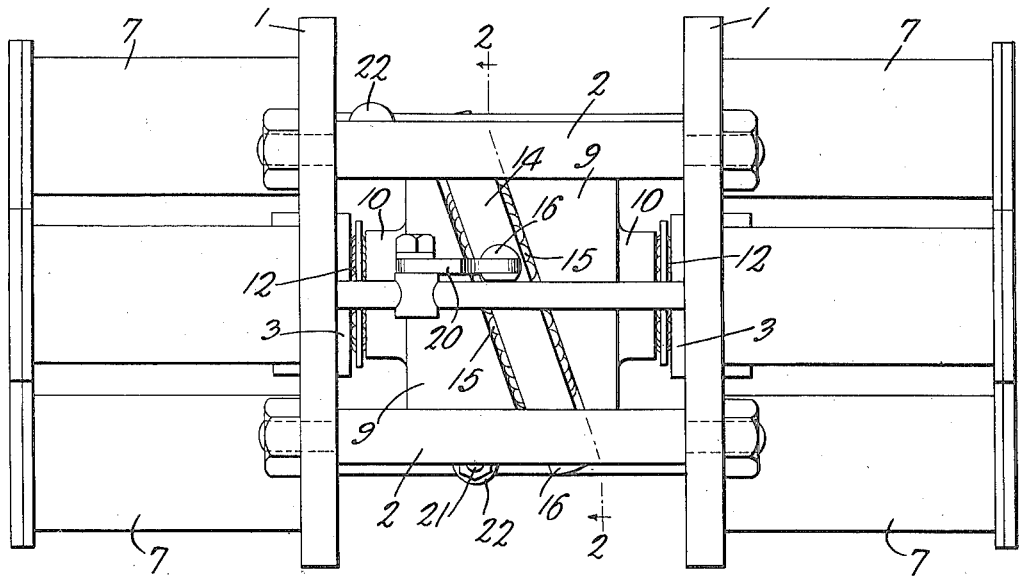
Figure 2:
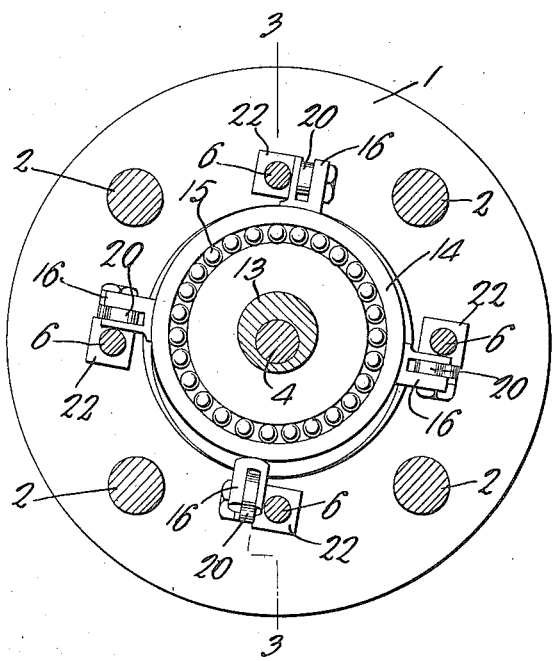

Figure 1 is a side elevation of an engine having the mechanical movement assembled therewith. Fig. 2 is a cross section on the line 2—2 of Fig. 1. Fig. 3 is a longitudinal section on the line 3—3 of Fig. 2. Fig. 4 is a view similar to Fig. 3 illustrating a modification.

The mechanical movement is illustrated as being applied to an engine, although this is to be taken as typical only, since the movement can be used for various purposes where it is desired to rotate a member from a reciprocatory member, or vice versa, to reciprocate one or more members by means of a rotating member, without the use of a crank motion.

The structure embodies a pair of spaced parallel heads or supporting plates 1, connected by stays 2 which rigidly secure said plates together. Secured within the central portions of said plates are bearings 3 through which a shaft 4 is journaled, said shaft being disposed longitudinally while the plates 1 are disposed transversely or at right angles therewith. As illustrated, each of the plates 1 carries four outstanding cylinders 7, although the number of cylinders may be increased or diminished, the open ends of the cylinders being attached to the plates 1 in any suitable manner, and the cylinders projecting away from one another. The plates 1 have guides 5 through which the piston rods 6 are slidable, pistons 8 being secured to the remote ends of said rods and working within the cylinders. The pistons are connected in pairs by the piston rods, and are reciprocated by any suitable motive fluid, in order that the engine may use steam, gasolene or other motive power.

The use of the invention resides in the means for operatively connecting the piston rods 6 and the shaft 4 whereby the reciprocation of the piston rods will rotate the shaft, or if the device is used as a pump, whereby the rotation of the shaft 4 will reciprocate the piston rods 6. This connection between the shaft 4 and piston rods 6 embodies a pair of circular cam members 9 mounted upon the shaft 4 and having their adjacent faces arranged obliquely and spaced apart parallel with one another, to provide an oblique cam groove between said members. The remote sides of said members have outstanding bosses 10 which are secured to the shaft 4 by means of pins 11, or otherwise, in order that the members 9 are fixed to the shaft. It is preferable to provide anti-frictional balls 12 between the bosses 10 and bearings 3, whereby to reduce friction, said parts being provided with annular ball races, if preferred, for accommodating the balls. One of the members 9 has an oblique hub 13, perpendicular with its oblique face, and surrounding the shaft 4, as seen in Fig. 3.

Mounted for rotation upon the hub or boss 13 between the members 9, is a ring or annulus 14, and annular series of anti-friction balls 15 are preferably disposed between the sides of the ring 14 and the adjacent oblique faces of the members 9, said members and ring being preferably provided with annular ball races in which the balls run. Thus, the members 9 can rotate easily relative to the ring 14, when said ring is oscillated back and forth as will hereinafter more fully appear.

Bifurcated members 16, one for each piston rod 6, are pivotally connected with the periphery of the ring 14, said members 16 having reduced shanks 17 mounted for rotation within the ring 14. The shanks 17 are retained within the ring 14 in any suitable manner, such as by means of annular grooves 18 upon the shanks 17 into which pins or retaining elements 19 carried by the ring 14 project. Links 20 have certain ends pivoted within the bifurcated members 16, and have their other ends pivoted upon outstanding pintles 21 of cross heads 22 secured upon the piston rods 6. The links 20 can swing to and from the shaft 4, and the members 16 can swing about axes extending from the shaft 4, whereby universal joints are provided between the piston rods 6 and ring 14.

When the rods 6 are reciprocated in succession, they tend to oscillate the ring 14, and give said ring a wabbling motion, whereby the axis of the ring prescribes two opposite cones having their apices meeting at the center of the ring 14. It is believed that the motion of the ring 14 will be readily understood, and the ring in being confined within the annular groove between the members 9, will impart a rotatory movement to said members, thus rotating the shaft 4.

If the rods 6 are to be reciprocated by the movement of the shaft 4, the member 9 being rotated by said shaft will impart a wabbly movement to the ring 14, thus reciprocating the rods 6.

In Fig. 4, a different or modified means is illustrated for connecting the shaft 4 and piston rods 6. Thus, there is employed an obliquely arranged cam member 9' secured upon the shaft 4, and collars 10' can be secured upon the shaft to rest against the anti-frictional balls 12. The member 9' is provided with a peripheral or circumferential flange 13' upon which is mounted for rotation the ring 14'. Said ring is of U-shaped cross section so as to straddle the flange 13', and is composed of sections 14ᵃ and 14ᵇ of annular form and bolted or otherwise secured together detachably, as at 14ᶜ. Anti-frictional balls 15' are disposed between the side portions of the ring 14' and the opposite sides of the flange 13', whereby the member 9' can rotate easily relative to the ring. Bifurcated members 16' have their shanks 17' pivotally engaging the ring 14', and are linked to the piston rods 6, as above described. The operation of the modification is practically the same as the form above described, since the reciprocation of the piston rods will give the ring 14' a wabbling motion, thereby rotating the member 9' and shaft 4.

Having thus described the invention, what is claimed as new is:

1. A mechanical movement embodying a rotary shaft, a reciprocatory rod, a member mounted upon said shaft having an oblique flange, a U-shaped ring straddling said flange, and a connection between said rod and ring.

2. A mechanical movement embodying a rotary shaft, a reciprocatory rod parallel therewith, a member upon said shaft having an oblique portion, a ring engaging said oblique portion, a pivoted member carried by the periphery of the ring to swing about an axis extending from said shaft, and a link pivotally connected with said pivoted member and rod.

In testimony that I claim the foregoing as my own, I have hereto affixed my signature in the presence of two witnesses.

JAMES EDWARD EMLEY.

Witnesses:
G. N. COLLAND,
W. E. CHAFFIN.